United States Patent [19]

Cavender et al.

[11] Patent Number: 4,882,107

[45] Date of Patent: Nov. 21, 1989

[54] MOLD RELEASE COATING PROCESS AND APPARATUS USING A SUPERCRITICAL FLUID

[75] Inventors: Keith D. Cavender; Edmond J. Derderian, both of Charleston; Eugene L. Jarrett, St. Albans; Kenneth A. Nielsen, Charleston, all of W. Va.

[73] Assignee: Union Carbide Chemicals and Plastics Company Inc., Danbury, Conn.

[21] Appl. No.: 276,162

[22] Filed: Nov. 23, 1988

[51] Int. Cl.[4] ............ B29C 67/22; B29C 33/58; B29C 39/36; B29C 45/40

[52] U.S. Cl. .......................... 264/51; 264/54; 264/523; 264/175; 264/299; 264/310; 264/319; 264/328.1; 264/328.2; 264/338; 264/DIG. 83; 425/90; 425/817 R; 425/817 C; 426/515

[58] Field of Search ............ 264/51, 338, DIG. 83, 264/523, 319, 299, 175, 310, 328.1, 328.2, 54; 425/90, 817 R, 817 C; 426/512, 515

[56] References Cited

U.S. PATENT DOCUMENTS

| | | |
|---|---|---|
| 3,556,411 | 1/1971 | Nord et al. .......................... 239/581 |
| 3,647,147 | 3/1972 | Cook ................................... 239/599 |
| 3,659,787 | 5/1972 | Ito ........................................ 239/15 |
| 3,754,710 | 8/1973 | Chimura ............................. 239/597 |
| 3,907,202 | 9/1975 | Binoche ............................... 239/15 |
| 4,055,300 | 10/1977 | Binoche ............................... 239/15 |
| 4,097,000 | 6/1978 | Derr ................................... 239/599 |
| 4,582,731 | 4/1986 | Smith .................................. 427/421 |
| 4,681,714 | 7/1987 | Lopes et al. ...................... 264/46.6 |
| 4,734,451 | 3/1988 | Smith .................................. 524/493 |

OTHER PUBLICATIONS

Long, George E. "Spraying Theory and Practice" in *Chemical Engineering*, Mar. 13, 1978, pp. 73–77.

*CRC Handbook of Chemistry & Physics*, 67th Edition, 1986–1987, Boca Raton, Fla., CRC Press, Inc., pp. R–62 to R–64.

Kirk-Othamer Encyclopedia or Chemical Technology, Third Edition, vol. 6, New York, John Wiley & Sons, c 1979, A Wiley-Interscience Publication, pp. 386–426.

*Kirk-Othmer Encyclopedia of Chemical Technology*, Third Edition, vol. 21, New York, John Wiley & Sons, c 1983, A Wiley-Interscience Publication, pp. 466–483.

*Primary Examiner*—Philip Anderson
*Attorney, Agent, or Firm*—Paul W. Leuzzi

[57] ABSTRACT

A process which comprises (i) the generation of release surfaces by application to predetermined areas of a solid surface of a solution, suspension or dispersion of a release agent and a supercritical fluid that vaporizes from the release agent, (ii) the deposition of a mass onto the release surface containing the release agent, and (iii) the separation of the mass or a product derived from the mass from such surface covered by the release agent. Novel apparatus for carrying out the process are described.

50 Claims, 3 Drawing Sheets

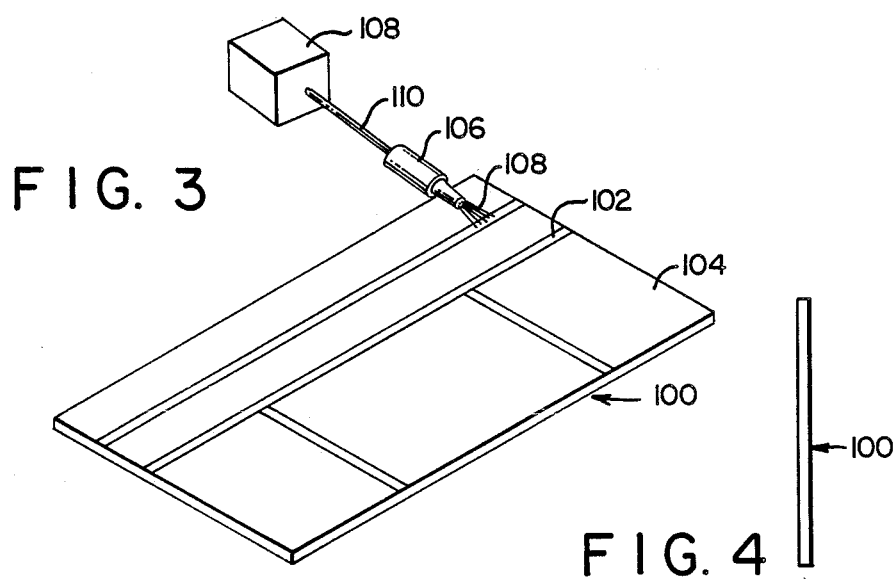
FIG. 3
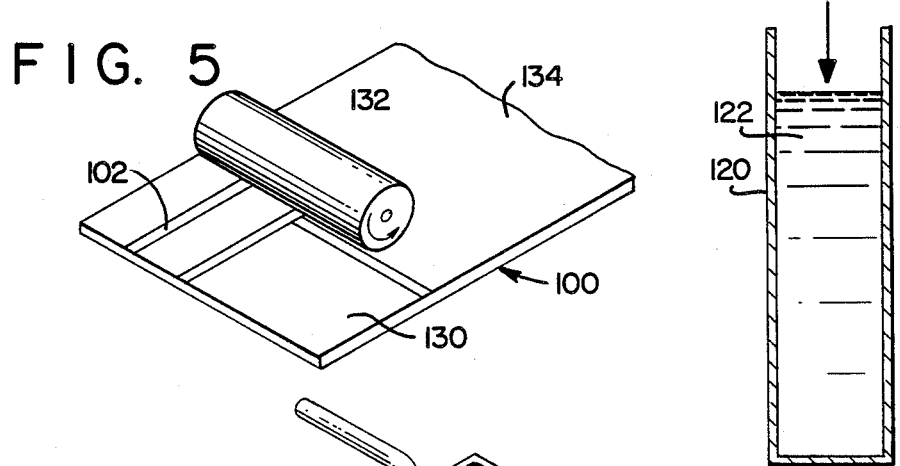
FIG. 4
FIG. 5
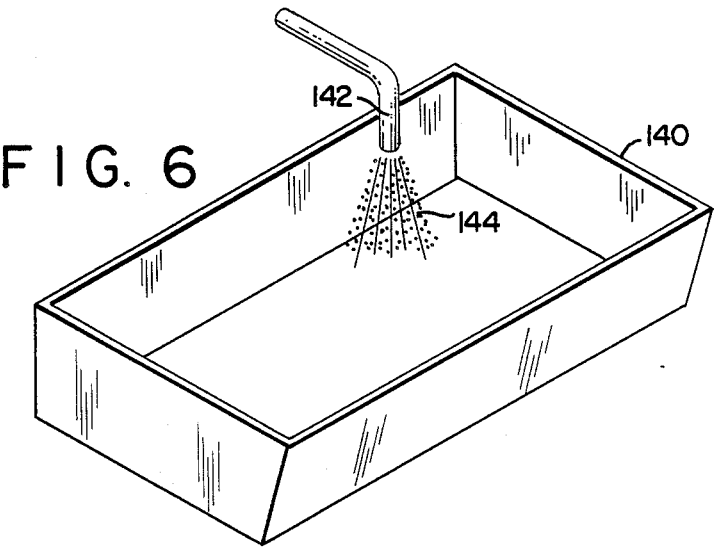
FIG. 6

MOLD RELEASE COATING PROCESS AND APPARATUS USING A SUPERCRITICAL FLUID

RELATED PATENT APPLICATIONS

This application contains subject matter related to U.S. patent applications Ser. No. 883,156, filed Jul. 8, 1986, abandoned, 133,068, filed Dec. 21, 1987, 218,896, filed Jul. 14, 1988, and 218,910, filed Jul. 14, 1988.

BRIEF DESCRIPTION OF THE INVENTION

A process which comprises (i) the generation of release surfaces by application to predetermined areas of a solid surface of a solution, suspension or dispersion of a release agent and a supercritical fluid that vaporizes from the release agent, (ii) the deposition of a mass onto the release surface containing the release agent, and (iii) the separation of the mass or a product derived from the mass from such surface covered by the release agent. Novel apparatus for carrying out the process are described.

BACKGROUND TO THE INVENTION

The use of supercritical fluids as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. However, the applicant characterizes fabrics as porous bodies.

Smith, U.S. Pat. No. 4,582,731, patented Apr. 15, 1986, and U.S. Pat. No. 4,734,451, patented Mar. 29, 1988, describes forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing fine films and powders. The films are used as surface coatings.

The aforementioned related applications are generally concerned with the formation of coatings utilizing supercritical fluids to reduce the viscosity of the coatings formulations. These applications stress the use of carbon dioxide ($CO_2$) for generating the supercritical fluid.

U.S. patent application Ser. No. 133,068, filed Dec. 21, 1987, to Hoy, et al., discloses a process and apparatus for the liquid spray application of coatings to a substrate and minimizes the use of environmentally undesirable organic diluents. The process of the application involves:

(1) forming a liquid mixture in a closed system, said liquid mixture comprising:
  (a) at least one polymeric compound capable of forming a coating on a substrate; and
  (b) at least one supercritical fluid, in at least an amount which when added to (a) is sufficient to render the viscosity of said mixture of (a) and (b) to a point suitable for spray applications; and (2) spraying said liquid mixture onto a substrate to form a liquid coating thereon.

The application is also directed to a liquid spray process in which at least one active organic solvent (c) is admixed with (a) and (b) above prior to the liquid spray application of the resulting mixture to a substrate. The preferred supercritical fluid is supercritical carbon dioxide. The process employs an apparatus in which the mixture of the components of the liquid spray mixture can be blended and sprayed onto an appropriate substrate. The apparatus contains (1) means for supplying at least one polymeric compound capable of forming a continuous, adherent coating;

(2) means for supplying at least one active organic solvent;

(3) means for supplying supercritical carbon dioxide fluid;

(4) means for forming a liquid mixture of components supplied from (1)-(3); and (5) means for spraying said liquid mixture onto a substrate.

The apparatus may also provide for (6) means for heating any of said components and/or said liquid mixture of components. U.S. patent application Ser. No. 133,068 demonstrates the use of supercritical fluids, such as supercritical carbon dioxide fluid, as diluents in highly viscous organic solvent borne and/or highly viscous non-aqueous dispersions coatings compositions to dilute the compositions to application viscosity required for liquid spray techniques. They further demonstrate that the method is generally applicable to all organic solvent borne coatings systems.

Copending U.S. application Ser. No. 218,910, filed Jul. 14, 1988, is directed to a liquid coatings application process and apparatus in which supercritical fluids, such as supercritical carbon dioxide fluid, are used to reduce to application consistency viscous coatings compositions to allow for their application as liquid sprays. The coatings compositions are sprayed by passing the composition under pressure through an orifice into the environment of the substrate.

In particular, the process of U.S. application Ser. No. 218,910 for liquid spray application of coatings to a substrate comprises:

(1) forming a liquid mixture in a closed system, said liquid mixture comprising:
  (a) at least one polymeric component capable of forming a coating on a substrate; and
  (b) a solvent component containing at least one supercritical fluid, in at least an amount which when added to (a) is sufficient to render the viscosity of said mixture to a point suitable for spray application; and (2) spraying said liquid mixture onto a substrate to form a liquid coating thereon by passing the mixture under pressure through an orifice into the environment of the substrate to form a liquid spray.

U.S. application Ser. No. 218,896, filed Jul. 14, 1988, is directed to a process and apparatus for coating substrates by a liquid spray in which (1) supercritical fluid, such as supercritical carbon dioxide fluid, is used as a viscosity reduction diluent for coating formulations, (2) the mixture of supercritical fluid and coating formulation is passed under pressure through an orifice into the environment of the substrate to form the liquid spray, and (3) the liquid spray is electrically charged by a high electrical voltage relative to the substrate.

In particular, the process of U.S. application Ser. No. 218,896 for electrostatic liquid spray application of coatings to a substrate comprises:

(1) forming a liquid mixture in a closed system, said liquid mixture comprising:
  (a) at least one polymeric component capable of forming a coating on a substrate; and
  (b) a solvent component containing at least one supercritical fluid, in at least an amount which when added to (a) is sufficient to render the viscosity of said mixture to a point suitable for spray application;

(2) spraying said liquid mixture onto a substrate to form a liquid coating thereon by passing the mixture under pressure through an orifice into the environment of the substrate to form a liquid spray; and (3) electrically charging said liquid spray by a high electrical voltage relative to the substrate and electric current.

Many applications in industry utilize solid release surfaces. The function of solid release surfaces is to allow the deposition of a material onto the surface and to remove it without having the material stick to the surface. One way of forming a solid release surface is to deposit a release agent onto the surface and have the release agent replicate the surface such that any material to be deposited onto the surface is not seemingly or intended to be adversely affected by such release agent. The use of release agents on a solid surface can create considerable problems, some of which are not well appreciated. For example- ♦ Where the release surface is a hot surface, the presence of the release agent on the surface creates a thermal gradient from the surface to the material applied to it. If the release agent is irregularly applied then the temperature across the surface of the release agent as applied to the surface will be nonuniform. This means that the material applied to the surface containing release agent will experience a variability of thermal effects. There are very few situations where this variability will not adversely affect properties of the material.

▷ One problem associated with supplying a release agent to a replicating surface is the irregular nature of the deposition owing to the large amount of release agent inevitably used. Illustratively, conventional spraying of a release agent to a release surface involves propelling a solution of the release agent (generally dissolved in a solvent) by a gas under pressure. The spray comprises droplets of the release agent and the droplets coalesce on the sprayed surface to form a film of considerable thickness. If the release surface is a mold, then the release agent is sprayed into the mold onto the mold surface(s). The material to be molded is supplied to the mold and the replication of the mold surface may take place under heat and pressure. Under the operating conditions, the mold release agent is to act as a barrier that keeps the molding material from contacting the mold surface. The mold release agent does this in three ways, as a vapor, a liquid or solid. It either vaporizes and provides a vapor barrier to the surface or it liquefies without vaporization if it starts out as a solid to form a liquid barrier or loses viscosity without vaporization if it starts out as a liquid to form a liquid barrier or it is sprayed from a solvent containing solution to the mold, and the solvent evaporates in the mold to deposit a solid wax film. In almost all cases, there is a viscosity reduction in the release agent that allows it to become more uniformly coated across the mold surface. However, this does not mean that the mold release agent exists as a uniform vaporous, liquid or solid layer on the mold surface. If the amount of release agent is excessive at any place in the mold, the surface of the mold will ultimately be nonuniformly coated. The heat from the mold surface received by the material being supplied and being acted upon in the mold is not going to be uniformly applied to it and this thermal variance can adversely affect the molded object being produced. Such adverse effects will typically exist at the surface of the molded object.

▷ In the case of irregularly shaped molds or cavity molds, there is a tendency of the sprayed on release agent to pool into thicker layers owing to gravitational flow to lower surface portions in the mold. As a result, there is an assured irregularity in the temperature across the mold surface that is experienced by the material being molded. This does not mean that portions of the mold surface are devoid of mold release agent; to the contrary, the point to be made is that portions of the mold surface have too much mold release agent.

♦ Even should the release agent be an uniformly applied layer on the release surface, the layer is relatively thick; sufficiently so that the layer penetrates the material being applied to the surface.

▷ For example, in the baking of goods in a baking pan, there are used release agents supplied to the surface of the baking pan that are made of vegetable oils. These oils penetrate the baking formulations such that the skin of the baked goods is essentially "french fried" by the vegetable oil and the surfaces of the baked goods have a consistency different from that of the interior of the goods. Indeed, if the condition were otherwise, one would question that the goods were properly baked.

▷ Some plastics possess crystalline and amorphous components. Penetrating release agents can attack either phase such that the surface of the molded piece is different from its interior.

▷ Many plastics that are molded are used for food applications where the food contacts the plastic. Of serious concern is the presence of mold release agents that adhere to the surface of the resulting molded plastic part that can adversely affect the performance of the molded part in one or more aspects of the use of the plastic. For example, even a thin layer of mold release agent on the surface of the plastic part has to be removed from the part or else it will contribute either a taste or texture factor to the food in contact with the part.

♦ Even when the conventionally sprayed release agent is an uniformly applied layer on the release surface, the layer is relatively thick; sufficiently so that the thick layer precludes the use of release agents in masking portions of a surface for subsequent application of a coating to the surface.

▷ There are many industrial applications where coating is limited to certain portions of a surface so that the uncoated surface can be subsequently used in another manner. For example, portions of a metal surface may be painted first and another portion left unpainted so that is can be used to effect bonding between surfaces. Illustrations are painted automobile or aircraft parts being adhesively bonded to other parts. In the case of solid state electronic circuits, portions of a dielectric surface are first masked before applying the electronic circuit. A problem that exists in such techniques is that the coating or masking cannot be applied in an industrial high volume production environment so that the uncoated portion occupies the minimal area on the surface for the subsequent application involved. Coating materials have a tendency to run or migrate therefore to assure that the coating-free surface remains coating-free, more of coating-free surface is allocated than is necessary for the subsequent application in which it is a functional surface. This is more of a problem where the surface is to be dip coated. It is most difficult to allocate a coating-free surface by the dipping process. It would be desirable to form coating-free portions on a surface which is to be otherwise dip coated and not have the release agent provided on the coating-free portions adversely affect the portion of the surface that is to be dip coated.

▷ It would be desirable to be able to pretreat the surface to be coated with a coating release agent at the portions of the surface that ultimately are to remain uncoated, and then apply the finish coating or masking to the whole surface, including that surface portion containing the coating release agent, and complete the coating or masking activity, such as curing or drying the coating or masking. After the activity is over, the surface where the coating release agent had been applied can be brushed to remove the unbonded portion of the coating or mask to leave a surface containing the coating release agent.

▷ The virtue of such a masking procedure resides in the ability to minimize the size of the uncoated (coating-free) portion of the surface. Such minimizes the presence of uncoated and unbonded areas on the surface.

▷ The technique would only be effective if the release agent does not migrate prior to or during the coating operation and is readily removable from the substrate. Owing in large part to the excessive amount of release agent that would be supplied to the surface by conventional techniques, migration of the release agent during some phase of the coating operation would occur. This would increase the coating-free portion of the surface in an uncontrolled manner.

▷ The technique would also require that the amount of release agent on the coating-free portion of the surface be readily removeable from the surface so as to avoid interfering with subsequent utilization of that coating-free surface.

Recognizing that release agents are high boiling or high melting materials with a high viscosity at ambient temperature and pressure conditions, in order to apply them to the release surface means that their viscosity has to be reduced at the moment they are applied to the surface. This has meant that the release agents had to be cut with solvents. Assuming that the solvents are toxicologically safe, their use introduces an environmental problem. When they are vaporized, they enter the atmosphere and are believed to contribute to smog formation. For example, hydrocarbon solvents have been widely employed as solvents for mold release agents. Enough concern exists that they represent an environmental problem because of their contribution to smog formation that water-based mold release formulations have been developed in order to eliminate these organic solvent emissions. However, the performance of these water-based compositions is significantly deficient relative to that of hydrocarbon-based materials because—

Δ they fail to provide as good release properties;
Δ they create a water disposal problem; and
Δ they may adversely affect the temperature of the surface being treated.

A novel system has been discovered for the application of a release agent to a surface over which another material is to be deposited and then removed. This system provides the ability to uniformly apply a release agent to a release surface and provides one or more of the following advantages:

◊ The use of organic solvents can be eliminated or minimized.
◊ The concentration of release agent on the release surface can be materially reduced.
   Solid release agents can be used where liquids had previously been employed because the release agent can be uniformly deposited as small particles on the release surface.
◊ The release agent can be supplied as a liquid from a sprayhead of a spray device and immediately upon clearance from the sprayhead, the spray exists as a fine mist of particles, each particle having a much greater viscosity than that of the liquid from which they are derived.
- ◊ The release agent may be applied to less of the surface than the other material is applied to, so that the other material covers surface containing the release agent and surface which is free of the release agent. The other material is removed from surface containing the release agent.
- ◊ The release agent may be applied using standard spray technology.

THE INVENTION

The invention relates to a process which comprises (i) the generation of release surfaces by spray coating predetermined areas of a solid surface with a release agent obtained from a solution, suspension or dispersion of a release agent and a supercritical fluid that vaporizes from the release agent, (ii) the deposition of a mass onto the release surface containing the release agent, and (iii) the separation of the mass or a product derived from the mass from such surface which is covered by the release agent.

More particularly, the invention relates to a process which comprises (i) generating release surfaces by spray coating a release agent obtained from a solution, suspension or dispersion of a release agent and a supercritical fluid that vaporizes from the release agent from a high pressure zone through an orifice to a low pressure zone outside of the orifice, to form a spray of release agent particles which are deposited onto predetermined areas of a solid surface, preferably as an essentially uniform film covering the predetermined areas, (ii) depositing a mass onto the release surface containing the release agent, and (iii) separating the mass or a product derived from the mass from such surface which is covered by the release agent.

The invention has broad industrial applications and includes such arts as molding plastics, resins and elastomers, baking food products and coating surfaces, all of which utilize a release surface to prevent the adhesion of plastics, resins, food products and coatings to the substrate to which they are supplied or applied, as the case may be. Broadly speaking, the invention has application wherever a hardenable material is deposited onto a surface area to which it is not desired to be bonded but of its nature and that of the surface, it hardens on the surface and adheres to it sufficiently that there is difficulty in cleanly removing all of the deposition from the surface. The invention provides a method of avoiding such adherence.

The invention embraces a process of uniformly depositing a thin layer of release agent over a predetermined surface in such a manner that migration of the release agent from such area is minimized, if not altogether eliminated. The invention also embraces the deposition of such a thin layer of the release agent over the predetermined surface that migration of the release agent into the subsequently applied material is significantly minimized, preferably essentially avoided. As a result, molded or baked objects are obtainable essentially free of surface effects derived from interaction between a release agent and the objects, thereby making the objects more homogeneous throughout their structures. In addition, such limited amounts of release agent are provided on a surface by the process of the invention that little, if any, release agent flows into adjacent surface area, even when coated over by a liquid containing a solvent, such as paints, lacquers, inks, and the like.

Because the amount of the release agent provided on the surface is so small, the release surface is amenable to being easily made suitable for a subsequent deposition or treatment of the release surface. Indeed, there are instances where the amount of the release agent has no adverse effects on the subsequent treatment of the release surface for other purposes and therefore, it is not required to clean the release surface of residual amounts of release agent before using the surface for other purposes. However, in any event, the invention uses so little of the release agent on the release surface to provide the desired non-bonding to the surface, that little effort is required to prepare the surface for a subsequent treatment. For this reason, the invention is particularly desirable for use with coating applications where it is desired to use the provision of a release surface on the object being coated. As a result, one may arbitrarily coat the surface or surfaces of the object, even by dipping, and the relatively thick coating generated by dipping can be removed from the release surface by simply brushing the surface. As a result, it is not necessary to impart a template or mask onto the surface to prevent coating of a select surface on the object and therefore a complicated step is avoidable.

The preferred use of the invention is in the molding of thermosetting resins and thermoplastics to form shaped articles in which the interior molding surface(s) of the mold in which the thermosetting resins and thermoplastics are to be molded are sprayed with a release agent obtained from a solution, suspension or dispersion of a release agent and a supercritical fluid that vaporizes from the release agent, the thermosetting resin or thermoplastic are supplied to the mold in contact with the interior molding surface(s) and molded therein to effect the shape conferred by the mold, and then the molded shaped article is removed from the mold essentially, if not entirely, free of the release agent.

Illustrative of such thermosetting resins are, e.g., crosslinkable acrylics, phenol-formaldehydes, alkyds, melamine-formaldehydes, unsaturated polyesters, epoxides, and the like. Illustrative thermoplastics include, for example, polyethylene, polypropylene, polystyrene, polyacrylates, PVC, polycarbonates, polysulfone, ionomers and reinforced materials.

This invention embraces as well, processes and apparatus for the application of mold release formulations to mold surfaces wherein the use of organic solvents is either minimized or totally eliminated. The process comprises:

a. forming a fluid mixture in a closed system, said fluid mixture comprising:
  i. at least one release agent capable of forming a thin layer or coating on the mold surface,
  ii. at least one supercritical fluid, and
  iii. optionally, a reduced amount, such as a minor amount inclusive of a small amount, of an active solvent or solvents capable of dissolving, suspending or dispersing the release agent;
b. spraying said fluid mixture onto a mold surface to form a thin layer of the release agent thereon;
c. introducing a molding composition to the mold surfaces containing the thin layer of release agent thereon and molding the compositions; and
d. removing the molded composition from the mold.

The invention as it applies to molding, finds exceptional utility in a variety of molding procedures, such as reaction injection molding (RIM), injection molding, compression molding, bulk molding, transfer molding, cast molding, spin cast molding, casting, vacuum forming, blow molding, calendar molding, lamination, molding of foam, rotational molding, and the like.

This invention does not require, in most cases, that the release agent be a material uncommon for that purpose. The process of the invention is amenable to the employment of standard release agents and by virtue of the manner in which the release agent is diluted by the supercritical fluid, it is rendered useful for the practice of the invention. Consequently, the release agent may be a liquid or waxy material possessing the requisite release properties for the materials to which it is applied. In a preferred embodiment, the process comprises:

a. forming a fluid mixture in a closed system, said fluid mixture comprising:
  i. at least one wax compound capable of forming a layer on the mold surface,
  ii. at least one supercritical fluid, and
  iii. optionally, a reduced amount, such as a minor amount inclusive of a small amount, of an active solvent or solvent(s) capable of dissolving, suspending or dispersing the wax compound(s);
b. spraying said fluid mixture onto a mold surface to form a thin wax layer thereon;
c. introducing a molding composition to the mold surface containing the thin wax layer of release agent thereon and molding the compositions; and
d. removing a molded article from contact with the mold surface.

The invention finds its ultimate expression in the molding of polyurethanes such as polyurethane resins and foams involving the formation of the polyurethane per se or the polyurethane foam in an open or closed mold. The difference between molding polyurethanes or polyurethane foams according to the invention and according to the prior art, is that the mold in this invention is pretreated by spray coating predetermined areas of a solid mold surface with a release agent obtained from a solution, suspension or dispersion of a release agent and a supercritical fluid that vaporizes from the release agent.

The invention includes processes and apparatus for preparation of a mold in which the polymerization of an active hydrogen compound and an isocyanate compound is carried out to form a molded article conforming to the mold, wherein the mold is prepared prior to said polymerization by the process which comprises:

a. forming a fluid mixture in a closed system, said fluid mixture comprising:
  i. at least one wax compound capable of forming a layer on the mold surface,
  ii. at least one supercritical fluid, and
  iii. optionally, a reduced amount of an active solvent or solvent(s) capable of dissolving, suspending or dispersing the wax compound(s);
b. spraying said fluid mixture onto a mold surface to form a wax layer thereon;
c. effecting polymerization of an active hydrogen compound and an isocyanate compound in contact with the sprayed mold surface to form a molded article on the surface; and
d. removing the molded article from contact with the sprayed mold surface.

The invention is also directed to an apparatus in which the mixture of the components of the fluid spray mixture can be blended and sprayed onto an appropriate surface.

Thus, the invention includes an apparatus for the deposition of a supercritical fluid blend containing a release agent which comprises
a. closed container means for forming a supercritical fluid,
b. means for reducing the viscosity of a release agent,
c. means for combining the release agent and the supercritical fluid and maintaining the supercritical fluid in the supercritical fluid state, and
d. means for spraying the combination in the supercritical state to a release surface, and
e. a release surface onto which the release agent is deposited.

BRIEF DESCRIPTION OF THE DRAWINGS

FIG. 3 is a perspective view of a circuit board to which is sprayed a fine pattern of a release agent formulation depicting an electronic circuit on the board.

FIG. 4 is a segment cross sectional side view of a dipping operation utilizing the process of the invention.

FIG. 5 is a perspective view of wiping procedure for removing coating at the release surfaces of a circuit board which had undergone the treatment characterized in FIGS. 3 and 4, supra.

FIG. 6 is a perspective view shows the spraying of release agent in accordance with the process of the invention in a baking pan prior to addition of the food preparation.

DETAILS OF THE INVENTION

Figure 1:
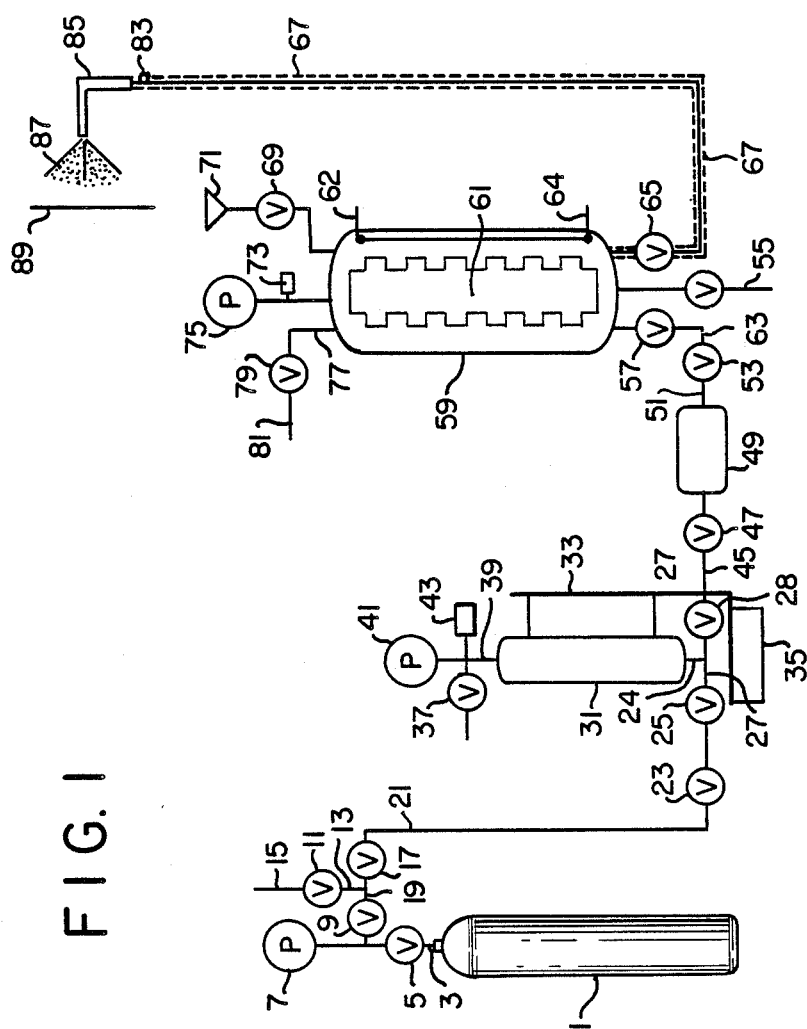
FIG. 1 is a schematic diagram of a spray apparatus that can be used in the present invention.
Figure 2:
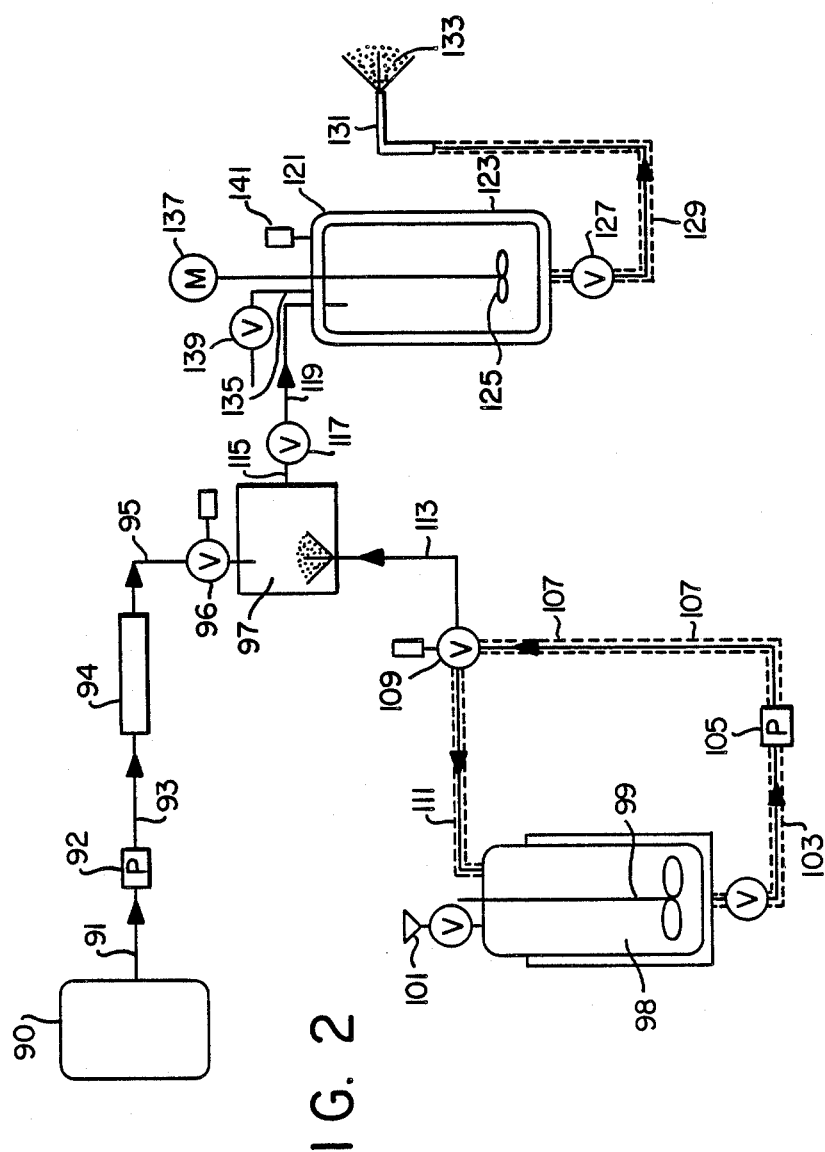
FIG. 2 is a schematic diagram of an another spray apparatus that can be used in the present invention.

The invention relates to the use of supercritical fluids in the spray application of release agents to a surface and the application of a releasable material applied to the surface containing the release agent, followed by the separation of the releasable material from contact with the surface.

At the outset, it should be recognized that reference to supercritical fluids as solvents for release agent will connote the dissolving of the release agent by the supercritical fluid. The invention is not limited to the dissolution of the release agent by the supercritical fluid; the invention encompasses the dispersion and suspension of the release agent by the supercritical fluid. Therefore, where there is the tendency herein to lump solvency as the sole function of the supercritical fluid, it is to be understood that solvency is intended to mean that the release agent is rendered into a more dilute flowable condition by virtue of the supercritical fluid, and therefore, solvency means dissolving, suspending or dispersing of the release agent by the supercritical fluid so that the combined fluidity is characterizable by a lower viscosity and a more fluid composition for the transport of the release agent.

The supercritical fluid phenomenon is well documented, see pages F-62–F-64 of the CRC Handbook of Chemistry and Physics, $67^{th}$ Edition, 1986–1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure of that compound.

Examples of compounds which are known to have utility as supercritical fluids are given in Table 1. t,0220
Due to the low cost, low toxicity and low critical temperature of carbon dioxide, supercritical carbon dioxide fluid is preferably used in the practice of the present invention. For many of the same reasons, nitrous oxide ($N_2O$) is a desirable supercritical fluid in the practice of the present invention. However, use of any of the aforementioned supercritical fluids and mixtures thereof are to be considered within the scope of the present invention.

The solvency of supercritical carbon dioxide is similar to that of a lower aliphatic hydrocarbon and, as a result, one can consider supercritical carbon dioxide as a replacement for the hydrocarbon solvent of a conventional mold release formulation. In addition to the environmental benefit of replacing hydrocarbon solvents with supercritical carbon dioxide, there is a safety benefit also, because carbon dioxide is nonflammable and nontoxic.

The purpose of the invention is to utilize such compounds in combination with mold release agents for applying the agents to a release surface. The utility of any of the above-mentioned compounds as supercritical fluids in the practice of the present invention will depend upon the release agent, whether it is a wax material or a liquid, whether there is present an active solvent, and the like considerations.

Release agents come in many forms and compositions. Most mold release agents are waxes, waxlike or greases. Release agents for food products, such as hydrogenated vegetable oils such as shortenings, lecithin, and the like, are solid waxlike or grease-like materials at operative food preparation temperatures. In addition, there are liquids that can be used as mold release agents.

Considering the various attributes of a release agent, it is desired that the release agent be a material that has minimum flow characteristics on the release surface. It is desired that the release agent not have such flow on the release surface that the release agent interferes with the uniform application of the material to be released from the release surface. Therefore, on application, the release agent should deposit and remain essentially fixed to the surface that it is deposited on without any substantial migration from the point of deposition.

A significant advantage of the invention is that it provides a thin uniform layer of the release agent on the release surface. This layer is usually considerably thinner than that created by the usual spraying of the release agent onto the release surface. Though the layer of the release agent on the release surface can be a continuous film on the release surface, it is not necessary that it be such a film. However, when the release surface is heated, there is greater likelihood that a continuous film will be formed. If the release agent has flow when deposited on the release surface, there will be a tendency for coalescence of the sprayed particles on the release surface. Such coalesence will typically result in the fusion of particles whereby to form a continuous film of such fused particles. Even with such fusion, it is not necessary that in effecting fusion the particles lose the identity of the particulate state. Thus a continuous film of such particles can be formed which maintains the identity of the particles by providing the particle shapes in the film. In such a case, the topology of the film is irregular reflecting the uniqueness of each of the particles. However, if the sprayed particles of release agent do not coalesce on the release surface, then the layer of release agent can be a thin mass of discrete particles on the release surface. The invention accommodates the use of a layer of discrete particles of release agent in which a substantial portion of the particles are in a noncoalesced intermittent pattern. In such a case, even though portions of the release surface are openly exposed to the material deposited over the release agent, the small size of the release agent particles and the density of the layer of the particles on the surface protect the surface from being contacted by the material. It is this combination of particle size and density of the layer that assures the good release qualities. The particle size of the release agent deposited on the release surface is not narrowly critical. These particles may be liquid or solid. If the particles are extremely small, then it may prove necessary to spray the surface longer to achieve the desired density of the release agent coating on the release surface. If the particles are very large, then it may prove desirable to effect flow of the release agent on the release surface to cause as much coalescence as will effect the desired coverage to achieve the desired level of release. As a rule, the release agent particles supplied in the spray to the surface will be at least one (1) micron ($\mu$.) in diameter, preferably from about 2 to about 100 $\mu$., and most preferably from about 5 to about 50 $\mu$. The thickness of the release agent coating can vary greatly and thus, the film thickness of the release agent is not a narrowly critical limitation in the practice of the invention. It will be most common to want to put a coating on the release surface that is at least 1 $\mu$. thick but is not thicker than 100 $\mu$. In unusual cases, the thickness of the coating will be as great as 4 mils, and the usual thickness will be significantly less than that.

Release agents used for molding purposes are wax, waxlike, greases or liquids that are derived from petroleum sources or contain silicones (viz., polydimethylsiloxanes) or constitute a combination of the two or are salts of long chain saturated fatty acids such as stearic acid. The choice of release agent is tied to the composition being molded or otherwise being applied to the release surface. It is desired that the release agent not be so compatible with the material being applied to it that the agent dissolves in the material.

There is commercially available a wide range of chemicals being offered as release agents. They vary from such compositions as:

ethylene bis-stearamide, water soluble sulfated oil, dioctyl ester of sodium sulfosuccinic acid, nonpolar solvents and petroleum oils, monoalkyl primary amines, straight chain aliphatic hydrocarbons, polyolefins, hydrogenated castor oil, methyl hydroxystearate, mixture of esters, fatty acids in petroleum oil base, blends of esters, blend of fatty acid derivatives and surface active compounds, dimethyl silicone fluids, silicone mica -glycol emulsion, single, double, and triple pressed and food grade stearic acid, single and double pressed oleic acids distilled, phosphated mono and diglycerides, modified fatty acid amide, emulsion of dimethyl siloxane, amide wax, oleyl palmitamide, stearyl erucamide, calcium stearate, zinc stearate, potassium and sodium ricinoleate, microcrystalline wax, N-(2-hydroxyethyl) 12-hydroxystearamide, polyvinylpolypyrrolidone, crystalline, aliphatic, saturated polyethylene of 500 molecular weight, crystalline, aliphatic, saturated high density polyethylene of 700 molecular weight, crystalline, aliphatic, saturated high density polyethylene of 1000 molecular weight, crystalline, aliphatic, saturated high density polyethylene of 2000 molecular weight, emulsifiable high density polyethylene, fatty amido-amine salt, fatty amide, synthetic waxes, silicone oxyalkylene copolymers, methyl phenyl silicones, lecithin, surfactants such as nonionics, anionics, cationics and amphoterics, and the like.

The wax compounds suitable for use in this invention as mold release waxes are any of the waxes known to those skilled in the art of mold release formulations. In general, wax refers to a substance which is a plastic solid at ambient temperature but at moderately elevated temperatures becomes a low viscosity liquid. These include insect and animal waxes as well as petroleum waxes, polyethylene waxes, Fischer-Tropsch waxes, chemically modified hydrocarbon waxes and substituted amide waxes.

The silicone release agents are typically based on silicone liquid compositions such as polydimethylsiloxanes or polymethylphenylsiloxanes having a methyl or methyl and phenyl to silicon ratio of at least about 2, preferably 2 or greater than 2. They can be blended with hydrocarbon materials, such as solvents and waxes.

Illustratively, the release agent such as a wax component of a mold release composition, is generally present in amounts ranging from 0.1 to 30 wt % based upon the total weight of the mold release composition. Preferably, the wax component would be present in amounts ranging from 0.5 to 20 wt % on the same basis.

As pointed out above, the release agent may be employed in the practice of the invention without the use of a solvent other than the supercritical fluid solvent. The active solvent(s) other than the supercritical fluid suitable in the practice of this invention includes any solvent or mixture of solvents which is capable of dissolving, dispersible or suspending the release agent system in combination with the supercritical fluid. It is quite apparent that the selection of solvent will be dependent upon the release agent that is used. Since most release agents are oleophilic, the solvents will typically be hydrocarbon based materials.

Generally, solvents suitable for this invention must have the desired solvency characteristics as aforementioned and also the proper balance of evaporation rates so as to insure good coating formation of the release agent. A review of the structural relationships important to the choice of solvent or solvent blend is given by Dileep et al, Industrial and Engineering Chemistry Product Research and Development 24, 162, 1985 and Francis, A. W., Journal of Physical Chemistry 58, 1099, 1954.

In order to diminish or minimize the unnecessary volatilization of any active solvent present in the fluid spray mixture, the amount of active solvent used should be less than that required to produce a mixture of release agent and active solvent having a viscosity which will permit its application by fluid spray techniques. In other words, the inclusion of active solvent(s) should be diminished or minimized such that the diluent effect due to the presence of the supercritical fluid diluent is fully utilized.

Suitable active solvents include: aliphatic hydrocarbons such as hexane, heptane, octane, nonane, decane, undecane, dodecane, and other higher molecular weight aliphatic hydrocarbons; aromatic hydrocarbons such as benzene, toluene, xylene and other aromatics, either singly or in mixtures; halogenated aliphatic and aromatic hydrocarbons such as halogenated methanes, ethanes, propanes, and higher molecular weight homologs, as well as halogenated benzenes, and the like; oxygenated solvents such as alcohols, ketones, aldehydes, ethers, esters, glycol ethers, glycol ether esters and others; water; surface active compounds such as nonionic, anionic, cationic and amphoteric surfactants.

In general, the amount of active solvent(s) (other than the supercritical fluid) should be minimized so that the beneficial effect due to the presence of the supercritical fluid is maximized. It is preferred that the only solvent used with the release agent is the supercritical fluid. However, the desired solvency, dispersibility or suspensionability of the release agent may not be achieved using the supercritical fluid alone. In that case, the other active solvents are provided in the release agent formulation. Overall, the other solvent(s) should be present in amounts ranging from 0 to about 70 weight percent based upon the total weight of the release agent(s), solvent(s), and supercritical fluid, which in this case is termed a diluent. In such a case, the solvent(s) is more typically present in the formulation of the release agent formulation in the range of from 0.15 wt % to 60 wt % bases upon the weight of the total mold release composition, and most preferably, between 0.3 wt % and 30 wt % on the same basis. Most preferably, the solvent(s) are present in amounts ranging from about 0.5 to 30 weight percent on the same basis. The choice of wax compound(s) and active solvent(s) other than the supercritical fluid solvent should take into consideration the fact that the spray temperature cannot exceed the temperature at which thermal degradation of any component of the fluid spray mixture occurs. Therefore, these components should not degrade under the spray conditions.

The supercritical fluid diluent should be present in such amounts that a fluid mixture is formed that possesses such a viscosity that it may be applied as a fluid spray.

If supercritical carbon dioxide fluid is employed as the supercritical fluid diluent, i.e., another active solvent is present, preferably $CO_2$ should be present in the mixture with the release agent and the other active solvent(s) in amounts ranging from about 10 to about 95 weight percent based upon the total weight of components forming the sprayable release agent formulation. Most preferably, it is present in amounts ranging from about 20 to about 95 weight percent on the same basis.

If a release agent is mixed with increasing amounts of supercritical fluid in the absence of another active solvent, the composition may at some point separate into two distinct phases. Prior to this condition, the addition of the supercritical fluid such as supercritical carbon dioxide fluid will have reduced the viscosity of the viscous release agent composition to a range where it can be readily atomized such as by passing it through a spray orifice of an airless spray gun. After atomization, a majority of the carbon dioxide vaporizes, leaving substantially the composition of the original release agent formulation. Upon contacting the substrate, the remaining fluid mixture of release agent and solvent(s) component(s) will flow to produce a thin, uniform, smooth film on the substrate. If the release agent is a wax, and another active solvent is not used, then the release agent may be solidified as fine particles that are uniformly deposited onto the release surface.

It is to be understood that a specific sequence of addition of the components of the mold release composition is not necessary in the practice of the present invention. However, it is often preferred to initially mix the release agent, such as a wax release agent, and the active solvent(s) other than the supercritical fluid, if they are employed.

The process and apparatus of the invention comprise means for effecting a pressurized mixture containing the release agent and the supercritical fluid, means for spraying the pressurized mixture to a release surface, a release surface onto which the release agent is deposited, means for the introduction of a material that is to be released from the release surface, and the step of releasing the material from contact with the release agent and the release surface.

In that context, the pressurized mixture of the release agent dissolved, suspended or dispersed in the supercritical fluid is transported to the nozzle of the spray device where the fluid containing the release agent is rapidly issued through a relatively narrow orifice into an expanded area which causes an immediate pressure drop. This rapid release of pressure tends to cause the supercritical fluid to expand to a gas or vapor immediately, at an expansion rate far greater than the more dense release agent and any active solvent that accompanies the release agent. The release agent and any accompanying solvent is broken into discrete particles and the gaseous or vaporous component which was the supercritical fluid disappears from the particles into the general atmosphere.

The spray pressure used in the practice of the present invention is a function of the release agent formulation, the supercritical fluid being used, and the viscosity of the liquid mixture. The minimum spray pressure is at or slightly below the critical pressure of the supercritical fluid. Generally the pressure will be below about 5000 psi. Preferably the spray pressure is above the critical pressure of the supercritical fluid and below about 3000 psi. If the supercritical fluid is supercritical carbon dioxide fluid, the preferred spray pressure is between about 1070 psi and about 3000 psi. The most preferred spray pressure is between about 1200 psi and about 2500 psi.

The spray temperature used in the practice of the present invention is a function of the release agent formulation, the supercritical fluid being used, and the concentration of supercritical fluid in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° C. The maximum temperature is determined by the thermal stability of the components in the liquid mixture. The preferred spray temperature is between 35° C. and 90° C. The most preferred temperature is between 45° C. and 75° C. Generally liquid mixtures with greater amounts of supercritical carbon dioxide fluid require higher spray temperatures to counteract the greater cooling effect.

Typically the spray undergoes rapid cooling while it is close to the orifice, so the temperature drops rapidly to near or below ambient temperature. If the spray cools below ambient temperature, entrainment of ambient air into the spray warms the spray to ambient or near ambient temperature before the spray reaches the substrate. This rapid cooling is beneficial, because less active solvent(s) evaporates in the spray in comparison to the amount of solvent lost in conventional heated airless sprays. Therefore a greater proportion of the active solvent is retained in the release agent formulation to aid leveling of the release agent on the release surface substrate. Conventional heated airless sprays also cool to ambient temperature before reaching the release surface substrate, because of solvent evaporation and entrainment of ambient air.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment in which the liquid spray of the present invention is conducted is not narrowly critical. However, the pressure therein must be less than that required to maintain the supercritical fluid component of the liquid spray mixture in the supercritical state. Preferably, the present invention is conducted in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

The present process may be used to apply release agents by the application of liquid spray to a variety of release surface substrates. The choice of substrates is therefore not critical in the practice of the present invention. Examples of suitable substrates include but are not limited to metal, wood, glass, plastic, paper, cloth, ceramic, masonry, stone, cement, asphalt, rubber, and composite materials. The substrate may be a conductor or a dielectric.

There are a broad variety of spray devices that one may use in carrying out the invention. Essentially any spray gun may be used, from conventional airless and air-assisted airless spray devices to electrostatic spray devices. The choice of spray device is dependent upon the kind of application in which the invention is used.

Airless spray uses a high pressure drop across the orifice to propel the release agent formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the release agent formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

The present invention may utilize compressed gas to assist formation of the liquid spray and/or to modify the shape of the liquid spray that comes from the orifice.

The assist gas is typically compressed air at pressures from 5 to 80 psi, with low pressures of 5 to 20 psi preferred, but may also be air with reduced oxygen content or inert gases such as compressed nitrogen, carbon dioxide, helium, argon, or xenon, or a mixture. Compressed oxygen or oxygen enriched air is not desirable, because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably the flow rate and pressure of the assist gas are lower than those used in air spray. The assist gas may be heated to counteract the cooling effect of the supercritical fluid diluent in the liquid spray.

Airless spray and air-assisted airless spray can also be used with the liquid release agent formulation heated or with the air heated or with both heated. Heating reduces the viscosity of the liquid release agent formulation and aids atomization.

The fluid mixture of the release agent and the supercritical fluid is sprayed onto a substrate to form a coating thereon by passing the fluid mixture under pressure through an orifice into the environment of the substrate to form a fluid spray. An orifice is a hole or an opening in a wall or housing, such as in a spray tip of a spray nozzle on an airless spray gun, through which the fluid mixture of the release agent with or without active solvent and the supercritical fluid flows in going from a region of higher pressure, such as inside the spray gun, into a region of lower pressure, such as the air environment outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional electrostatic, airless and air-assisted airless spraying of coating formulations such as paints, lacquers, enamels, and varnishes, are suitable for spraying release agent formulations with supercritical fluids, that is, for spraying the supercritical fluid containing mixture of the invention. Spray guns, nozzles, and tips are preferred that do not have excessive flow volume between the orifice and the valve that turns the spray on and off. The spray guns may be automatic or hand spray. The spray guns, nozzles, and tips must be built to contain the spray pressure used.

The material of construction of the orifice is not critical in the practice of the present invention, provided the material possesses necessary mechanical strength for the high spray pressure used, has sufficient abrasion resistance to resist wear from fluid flow, and is inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for the practice of the present invention generally range from about 0.004-inch to about 0.072-inch diameter. Because the orifices are generally not circular, the diameters referred to are equivalent to a circular diameter. The proper selection is determined by the orifice size that will supply the desired amount of release agent and accomplish proper atomization for the release agent. Generally smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore small orifice sizes from about 0.004-inch to about 0.025-inch diameter are preferred. Orifice sizes from about 0.007-inch to about 0.015-inch diameter are most preferred.

The designs of the spray tip that contains the spray orifice and of the spray nozzle that contains the spray tip are not critical to the practice of the present invention. The spray tips and spray nozzles should be essentially free of protuberances near the orifice that could/would interfere with the spray.

The shape of the spray is not critical to the practice of the present invention but it can be important in some applications of the invention. The spray may be in the shape of a cone that is circular or elliptical in cross section or the spray may be in the shape of a flat fan, but the spray is not limited to these shapes. Sprays that are flat fans or cones that are elliptical in cross section are preferred for applications requiring a broad sweeping deposition of the release agent. In those cases, wide-angle fans are most preferred.

The distance from the orifice to the release surface is not critical to the practice of the present invention. Generally the substrate in which a broad deposition of the release agent is effected will be sprayed from a distance of about 4 inches to about 24 inches. A distance of 6 inches to 18 inches is preferred. A distance of 8 inches to 14 inches is most preferred.

Devices and flow designs that promote turbulent or agitated flow in the liquid mixture prior to passing the liquid mixture under pressure through the orifice may also be used in the practice of the present invention. Such techniques include but are not limited to the use of pre-orifices, diffusers, turbulence plates, restrictors, flow splitters/combiners, flow impingers, screens, baffles, vanes, and other inserts, devices, and flow networks that are used in electrostatic, airless spray and air-assisted airless spray.

Filtering the liquid mixture prior to flow through the orifice is desirable in the practice of the present invention in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

Electrostatic forces are commonly utilized with orifice sprays such as air spray, airless spray, and air-assisted airless spray to increase the proportion of fluid release agent that is deposited onto the substrate from the fluid spray. This is commonly referred to as increasing the transfer efficiency. This is done by using a high electrical voltage relative to the substrate to impart a negative electrical charge to the spray. The substrate is electrically grounded. This creates an electrical force of attraction between the fluid spray particles and the release surface, which causes particles that would otherwise miss the surface to be deposited onto it. When the electrical force causes particles to be deposited on the edges and backside of the substrate, this effect is commonly referred to as wrap around. The release surface should be electrically conducting or be given a conducting surface before being sprayed.

The fluid spray can be electrically charged at any stage of the spray formation process. It can be charged by applying high electrical voltage and electrical current (1) within the spray gun, by direct contact with electrified walls or internal electrodes before passing through the orifice; (2) as the fluid emerges from the orifice, by electrical discharge from external electrodes located near the orifice and close to the spray; or (3) away from the orifice, by passing the fluid spray through or between electrified grids or arrays of external electrodes before the spray reaches the release surface.

Electrically charging the fluid spray as it emerges from the orifice is widely used. Usually a short pointed metal wire, which extends from the spray nozzle to beside the spray, is used as the electrode. When a high electrical voltage is applied to the electrode, electrical current flows from the point of the electrode to the fluid spray, which becomes charged. This method is used for air spray, airless spray, and air-assisted airless spray guns. It is used for both hand spray guns and automatic spray guns. Generally the electrical voltage ranges from 30 to 150 kilovolts. Release agent formulations that are sufficiently conductive will leak electrical charge through the fluid to the material supply system; these systems must be isolated from electrical ground so that the system itself becomes electrified. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 100 microamperes and optimum results are obtained with release agent formulations that have very low electrical conductivity, that is, very high electrical resistance.

The invention is specifically directed to a fluid spray process in which the fluid spray mixture of the release agent and the supercritical fluid is electrically charged by a high electrical voltage relative to the substrate. Preferably the substrate is grounded, but it may also be charged to the opposite sign as the fluid mixture or spray. The substrate may be charged to the same sign as the fluid mixture or spray, but at a lower voltage with respect to ground, but this is of less benefit, because this produces a weaker electrical force of attraction between the spray and the substrate than if the substrate were electrically grounded or charged to the opposite sign. Electrically grounding the substrate is the safest mode of operation. Preferably the fluid mixture and/or fluid spray is charged negative relative to electrical ground.

The method of electrostatically charging the release agentsupercritical fluid mixture and/or spray is not critical to the practice of the invention provided the charging method is effective. The fluid mixture can be electrically charged by applying high electrical voltage relative to the substrate and electrical current (1) within the spray gun, by direct contact with electrified walls or internal electrodes before passing through the orifice; (2) as the fluid emerges from the orifice, by electrical discharge from external electrodes located near the orifice and close to the spray; or (3) away from the orifice, by passing the fluid spray through or between electrified grids or arrays of external electrodes before the spray is deposited onto the substrate. Methods (1) and (2), individually or in combination, are preferred. Method (2) is most preferred. In charging method (1) above, the spray gun must be electrically insulating. The high voltage and electrical current is supplied to the fluid mixture inside the gun by direct contact with an internal surface that is electrically conducting and electrified. This may be part of the wall of the flow conduit inside the gun or internal electrodes that extend into the flow or a combination of electrified elements, including the spray nozzle. The contact area must be large enough to transfer sufficient electrical charge to the fluid mixture as it flows through the gun. This internal charging method has the advantage of having no external electrode that could interfere with the spray. A disadvantage is that if the fluid mixture is not sufficiently electrically insulating, electrical current leakage can occur through the fluid mixture to a grounded feed supply tank or feed delivery system. This reduces the amount of charge going to the spray. If current leakage is too high, then the feed supply tank and feed delivery system must be insulated from electrical ground, that is, be charged to high voltage. Current leakage can be measured by measuring the current flow from the high voltage electrical power supply without fluid flow. The current charging the spray is then the difference between the current with fluid flow and the current without fluid flow. The leakage current should be small compared to the charging current.

In charging method (2) above, the fluid spray is electrically charged as it emerges from the orifice or in the vicinity of the orifice. The spray gun and spray nozzle must be electrically insulating. The electrical charge is supplied from external electrode(s) close to the spray tip and adjacent to the spray. Under high electrical voltage, electrical current is discharged to the spray. The preferred electrodes are one or more metal wire(s) positioned adjacent to the spray. The electrodes may be either parallel to the spray or perpendicular to it or any orientation inbetween such that the electrical current issuing from the point is favorably directed to the fluid spray. The electrode(s) must be positioned close enough to the spray, preferably within one centimeter, to effectively charge the spray without interfering with the flow of the spray. The electrodes may be sharp pointed and may be branched. For planar sprays, one or more electrodes are preferably located to the side(s) of the planar spray so that electrical current is discharged to the face(s) of the spray. For oval sprays, one or more electrodes are located adjacent to the spray around the perimeter. The electrode(s) are located to effectively charge the spray. One or more auxiliary electrodes, which may be at a different voltage than the primary electrode(s) or electrically grounded, may be used to modify the electrical field or current between the primary electrode(s) and the spray. For example, a primary charging electrode may be on one side of the spray fan and a grounded insulated auxiliary electrode may by on the opposite side of the spray fan. Charging method (2) has the advantage of less current leakage through the fluid mixture than charging method (1). Fluid mixtures that are sufficiently conductive must have the feed supply and feed line insulated from electrical ground.

In charging method (3) above, the fluid spray is electrically charged farther away from the orifice and is more fully dispersed than in method (2). Therefore a larger network of external electrodes is required in order to effectively charge the spray. Therefore the method is less safe and less versatile. Also the distance between the electrodes and spray must be greater to avoid interfering with the spray. Therefore the charge applied to the spray is likely to be lower. But current leakage through the supply lines is eliminated. The fluid spray is passed through or between electrified grids or arrays of external electrodes before the spray is deposited onto the substrate. The spray particles are charged by ion bombardment from the electrical current discharged into air from the electrodes.

The present invention can be used with high electrical voltage in the range of about 30 to about 150 kilovolts. Higher electrical voltages are favored to impart higher electrical charge to the fluid spray to enhance attraction to the substrate, but the voltage level must be safe for the type of charging and spray gun used. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 200 microamperes and optimum results are obtained with coating formulations that have very low electrical conductivity, that is, very high electrical resistance. For automatic spray guns that are used remotely, higher voltages and electrical currents can be safely used than for hand spray guns. Therefore the voltage can exceed 70 kilovolts up to 150 kilovolts and the current can exceed 200 microamperes.

These methods of electrostatic charging are known to those who are skilled in the art of conventional electrostatic spraying.

Supercritical carbon dioxide fluid surprisingly has been found to be an insulating solvent with good electrical properties for electrostatic spraying. The fluid sprays give good electrostatic wrap around the substrate. This shows that the particles are highly charged and retain the electric charge.

Humid air can cause electrostatic sprays to lose their electrical charge more quickly than dry air; hence the electrostatic attraction to the substrate and wrap around is less effective. The supercritical carbon dioxide fluid diluent is beneficial for spraying in a humid environment, because the carbon dioxide as it vents from the spray tends to displace the humid air surrounding the spray. This helps the spray to retain its electric charge longer. When compressed air is used to assist electrostatic atomization, dry air is favored over humid air.

For electrostatic spraying, the substrate is preferably an electrical conductor such as metal. But substrates that are not conductors or semiconductors can also be sprayed. Preferably they are pretreated to create an electrically conducting surface. For instance, the substrate can be immersed in a special solution to impart conductivity to the surface.

The method of generating the high electrical voltage and electrical current is not critical to the practice of the current invention. High voltage electrical power supplies can be used in the same way as in conventional electrostatic spraying. The power supply should have standard safety features that prevent current or voltage surges. The electrical power supply may be built into the spray gun. Other charging methods may also be used.

More information about orifice sprays such as air spray, airless spray, and air-assisted airless spray, about heated orifice sprays, and about electrostatic spraying can be obtained from the general literature of the coating industry and from technical bulletins issued by spray equipment manufacturers, such as the following references:

a. Martens, C. R., Editor. 1974. Technology of Paints, Varnishes and Lacquers. Chapter 36. Application. Robert E. Krieger Publishing Company, Huntington, N.Y.

b. Fair, James. 1983. Sprays. Pages 466-483 in Grayson, M., Editor. Kirk-Othmer Encyclopedia of Chemical Technology. Third Edition. Volume 21. Wiley-Interscience, N.Y.

c. Zinc, S. C. 1979. Coating Processes. Pages 386-426 in Grayson, M., Editor. Kirk-Othmer Encyclopedia of Chemical Technology. Third Edition. Volume 6. Wiley-Interscience, N.Y.

d. Long, G. E. 1978 (Mar. 13). Spraying Theory and Practice. Chemical Engineering: 73-77.

e. Technical Bulletin. Air Spray Manual. TD10-2R. Binks Manufacturing Company, Franklin Park, Ill.

f. Technical Bulletin. Compressed Air Spray Gun Principles. TD10-1R-4. Binks Manufacturing Company, Franklin Park, Ill.

g. Technical Bulletin. Airless Spray Manual. TD11-2R. Binks Manufacturing Company, Franklin Park, Ill.

h. Technical Bulletin. Airless Spraying. TD11-1R-2. Binks Manufacturing Company, Franklin Park, Ill.

i. Technical Bulletin. Electrostatic Spraying. TD17-1R. Binks Manufacturing Company, Franklin Park, Ill.

j. Technical Bulletin. Hot Spraying. TD42-1R-2. Binks Manufacturing Company, Franklin Park, Ill.

k. Technical bulletin on air-assisted airless spray painting system. Kremlin, Incorporated, Addison, Ill.

U.S. Pat. Nos. 3,556,411; 3,647,147; 3,754,710; 4,097,000; and 4,346,849 disclose spray nozzles and tips for use in airless spray, including designs and methods of manufacture and methods of promoting turbulence in the atomizing fluid. U.S. Pat. No. 3,659,787 discloses a spray nozzle and use of electrostatics for airless spray. U.S. Pat. Nos. 3,907,202 and 4,055,300 disclose spray nozzles and use of electrostatics for air-assisted airless spray. None of these patents uses supercritical fluids as diluents to spray release agent formulations.

With respect to FIG. 1, there is shown a schematic diagram of supercritical carbon dioxide batch unit for spraying release agent formulations. Liquid carbon dioxide (bone-dry grade) cylinder (or any other source of $CO_2$) 1 provided with with eductor tube outlet 3, valve 5 and pressure gauge 7, supplies $CO_2$ to the feed tank 31 via valves 9, 17, 23 and 25, and lines 19, 21, 27 and 29. Valve 28 is closed to allow $CO_2$ feed to tank 31. Feed tank 31 is supported by frame 33 on weight scale 35 for monitoring the amount of $CO_2$ in tank 31. Tank 31 is provided with exit pipe 39 and the pressure in tank 31 is controlled by pressure gauge 41, pressure relief valve 43 and valve 37. When the $CO_2$ pressure in tank 31 reaches the desired value, feed from cylinder 1 is cut off by closing valve 25 or valve 17, or both. $CO_2$ is fed to the system via line 29 by opening valve 28, through line 45, valve 47 and pump 49. Pump 49 may be a Haskel ® air drive piston pump (Haskel Incorporated, Engineered Products Division, 100 E. Graham Place, Burbank, Calif. 91502). The purpose of pump 49 is to maintain the desired feed rate into vessel 59 through valves 53 and 57 and lines 51 and 55. Vessel 59 is a high pressure, agitated jacketed tank for blending the $CO_2$ with the release agent. In this particular embodiment, vessel 59 has a 10 liter capacity. Vessel 59 is provided with agitator means 61, thermocouples 62 and 64, and charging funnel 71 fitted to valve 69. At the bottom of vessel 59 are discharge line 63 fitted with a valve and heat controlled respray connection line 67 connected to vessel 59 via valve 65. Line 67 may be electrically heated to maintain the necessary supercritical temperature of the supercritical carbon dioxide fluid. Vessel 59 is fitted with vent line 77 connected to valve 79 connected to discharge vent line 81. The pressure in vessel 59 is monitored by pressure gauge 75 and controlled by pressure relief valve 73.

The supercritical fluid - release agent mixture is fed via heated line 67 fitted with thermocouple 83, and a thermocouple (not shown) at the start of line 67, to spray gun 85. The choice of spray gun is not narrowly critical. A wide variety of spray guns are available ranging from an artists spray gun that will draw fine lines to spray guns that generate a wide spray for the typical industrial applications encompassed by the invention. The spray 87 of the release agent is directed toward the release surface 89. Carbon dioxide is separated from the spray as the mixture is discharged from the spray nozzle and the emitted $CO_2$ is either vented to a $CO_2$ recovery system or to the atmosphere.

With respect to FIG. 2, there is schematically illustrated a continuous process and an apparatus assembly for spraying a release agent formulation onto a release surface. Liquid carbon dioxide (bone-dry grade) cylinder 90 supplies $CO_2$ to pump 92 via line 91. The $CO_2$ is typically fed at about ambient temperature. In pump 92, the $CO_2$ is brought to a supercritical pressure such as about 1200 psi. The pressurized $CO_2$ is passed to heat exchanger 94 through line 93. Supercritical $CO_2$ formed in heat exchanger 94 is passed through line 95 and pressure relief valve 96 to mixing chamber 97, containing an impingement manifold utilizing a static mixer (not shown). The release agent is prepared for mixing with the supercritical $CO_2$ in chamber 97 by adding the release agent with the solvent, if employed, via funnel 101 to a mixing tank 98 provided with stirrer 99. If the release agent is a wax, then mixing tank 98 is heat jacketed to bring the wax solvent mixture to a fluid condition. The fluid release agent mixture is removed from tank 98 through heat traced line 103 using pump 105. Line 107 may be electrically heated to maintain the necessary viscosity of the wax solvent mixture. From pump 105, the fluid mixture is passed by way of heat traced line 107 to valve 109. Recycle of the fluid mixture is effected through line 111 for effective temperature control. A part of the fluid mixture is passed through line 113 to mixing chamber 97 where it is dissolved, suspended or dispersed in the supercritical carbon dioxide fluid. The supercritical fluid mixture containing the release agent is carried from chamber 97 via line 115, through open valve 117 to line 119, and to high pressure vessel 121 which is fitted with vent line 135 connected to valve 139. The pressure in vessel 121 is controlled by pressure relief valve 141.

The supercritical mixture of the release agent-solvent mixture and the supercritical $CO_2$ is fed to holding vessel 121 containing stirrer 125 and the mixture of the supercritical fluid - release agent mixture is fed via heated line 129, through valve 127, to spray gun 131 and sprayed 133 onto the release surface.

With respect to FIG. 3, there is shown a perspective view of a circuit board to which is sprayed a fine pattern of a release agent formulation depicting an electronic circuit on the board. In particular, circuit board 100, made of a conventional composite material, is laid out on one surface with a geometric pattern 102 over which is sprayed a release agent formulation 108. Release agent formulation 108 is a finely focused spray emitted from an artist's airless spray gun 106 to which is supplied the supercritical fluid - release agent mixture via pressurized system 108, similar to that shown in FIGS. 1 and 2 hereof, and heated line 110. The spray gun may be robotically controlled or controlled by hand to effect the deposition of the release agent formulation within pattern 102. The remainder of the board's surface 104 is left for a masking coating. FIG. 4 shows the dip coating of the release agent treated board 100 of FIG. 3 into a container 120 containing coating material 122. After dipping board 100 in coating 122, the board may be treated to dry or cure the coating, as required, and coated board 100 is thereafter wiped according to the procedure depicted in FIG. 5.

FIG. 5 provides a perspective view of wiping procedure for removing coating at the release surfaces of a circuit board which had undergone the treatment characterized in FIGS. 3 and 4, supra. In FIG. 5, board 100 with coating 134 thereon, is subjected to a gentle wiping or abrading by rotating roller 132 over the surface of board 100. Roller 132, rotating counterclockwise in FIG. 5, contains soft bristles on its cylindrical surface that gently wipes away the portion of coating 134 located over pattern 102 to which had been provided the release agent formulation. As a result, the remaining coated portion of the board's surface are sections such as 132. This process can be repeated by cleaning the pattern 102 until it is free of the release agent formulation and then printing a circuit in the pattern. This procedure can be extremely effective by using a coating that is not receptive to the coating procedure used for effecting the printed circuit. This same technique can be used to control the coating of many different kinds of items. For example, one can use the technique to dip coat a part which is eventually to be welded to another part. Application of the release agent to the site for effecting the weld, and then dip coating the part, followed by a wiping of the part to release the coating over the release surface, provides the weld surface free of the coating. In this manner, the part can be coated more extensively than it could if it were welded first and the welded parts were collectively dip coated.

FIG. 6 demonstrates the breadth of the invention. In FIG. 6, baking pan 140 is internally coated via spray gun 142 so that release agent formulation spray 144 uniformly coats the interior of pan 140. This procedure is amenable to an automated procedure, such as a robotically controlled spray gun that sweeps the interior with the release agent formulation. As a result, the application of the release agent can be effected as part of an assembly line. The release agent formulation may be a vegetable shortening dissolved in the supercritical fluid. Supercritical carbon dioxide is a preferred supercritical fluid for this application because it is inert to the release agent at the operative temperatures.

A preferred objective of this invention is to demonstrate the use of supercritical fluids, e.g. supercritical carbon dioxide, as a solvent in mold release formulations for polyurethane foams. Prior to the present invention, mold release formulations for polyurethane foams were of two types, hydrocarbon solvent-based and water-based. The water-based compositions are not as effective as the hydrocarbon solvent-based compositions in effecting mold release. The hydrocarbon solvent-based formulations typically contain a wax which is dissolved or dispersed in a hydrocarbon solvent, e.g. a naphtha. The mode of use of these hydrocarbon-based compositions is to spray the liquid formulation onto the heated mold surface. Upon contact with the surface, the hydrocarbon evaporates leaving behind a coating of wax on the mold surface. The wax layer so deposited, effects the release of the urethane foam without damage to its integrity and having the appropriate skin characteristics. The process of the invention provides effective mold release of polyurethane foam with the minimization of use of hydrocarbon solvents. The following examples are provided to further illustrate the advantages of the invention in effecting the mold release of polyurethane foam. The examples are intended to be illustrative in nature and are not to be construed as limiting the scope of the invention.

EXAMPLE 1

This example illustrates the practice of a supercritical fluid mold release application process in a batch mode. The spray apparatus shown in FIG. 1 was used for this purpose.

A mold release formulation was prepared from 3,178 grams of a mold release compound and 3,904 grams of carbon dioxide. The mold release compound contained 273 grams of a microcrystalline paraffin wax having a melting point range of 88° to 100° C. and 2,905 grams of a hydrocarbon solvent having a boiling point range of 150° to 190° C. The total weight of the mold release composition was 7,082 grams of which carbon dioxide was 55.1 wt%, the hydrocarbon solvent was 41.0 wt% and the wax was 3.9 wt%.

This composition was prepared as follows:

The 10-liter high pressure vessel 59 was flushed with carbon dioxide from the high pressure carbon dioxide cylinder 1. With the 10-liter vessel at ambient temperature and pressure, the release compound was charged to the vessel through charging funnel 71. Vessel 59 was kept closed from the atmosphere and the carbon dioxide was charged to it via the $CO_2$ feed tank 31 using the Haskel pump 49. The 10-liter vessel 59 was then isolated from the pump. The pressure in vessel 59 was 850 psig and the temperature was 20° C. Line 67 to the spray gun 85 was then opened and the pressure dropped to 700 psig. Spray gun 85 is a Graco TM airless spray gun having a 13 mil orifice in the spray tip with a 60° fan width. The contents of the vessel were heated to 38° C.; the contents of line 67 were maintained at a temperature between 37° and 40° C. The pressure in vessel 59 was 2,400 psig. The contents of vessel 59 were then sprayed onto the internal mold surface of a hot (93° C.) laboratory mold for a period of 4 seconds. The spray which was produced was very fine and mistlike. Before spraying with this mold release composition, the surface of the hot mold was wiped clean of any residual wax from prior applications. A typical HR (high resiliency) urethane molded foam formulation, of low water content (about 3.3 part by weight per hundred parts by weight total of polyol) was poured into the mold at a mold temperature of 65° C. and the mold was then sealed. At the end of the customary de-mold time for this formulation (in this case 3 minutes), the lid was opened and the polyurethane foam was found to release easily and cleanly from the mold. The foam had a good, smooth surface typical of this formulation.

EXAMPLE 2

The same spraying apparatus, mold release composition, mold, and urethane foam formulation were used as in Example 1. The contents of the vessel 59 were at 2,050 psig and 34° C. before spraying. The flexible hose 67 leading to the spray gun was at 40° C. at the vessel 59 end and 45° C. at the spray gun 85 end. The contents of vessel 59 were then sprayed for a duration of 4 seconds onto the mold surface which was at 93° C. Before application of the mold release composition, the surface of the hot mold was wiped clean to remove any residual wax. The foam formulation was poured into the mold which was at 65° C. and which was then sealed. When the foam was demolded, it released easily and cleanly. The foam had a good, smooth surface typical of this formulation.

EXAMPLE 3

The same spraying apparatus, mold release composition, mold and urethane foam formulation were used as in Example 1. The contents of vessel 59 were at 950 psig and 33° C. before spraying. The flexible hose 67 was at 40° C. at the vessel 59 end and 29° C. at the spray gun 85 end. The contents of vessel were sprayed for 4 seconds on the mold surface which had been cleaned of residual wax. The mold surface was at 93° C. The spray was coarser than in Examples 1 and 2. The foam formulation was poured into the mold whose surface was at 63° C. and then the mold was sealed. When the foam was demolded, it released easily and cleanly. The foam had a good, smooth surface typical of this formulation.

EXAMPLE 4

The same mold and urethane foam composition were used as in Example 1. The mold was heated to 93° C. and wiped clean of residual wax as before. No mold release composition was sprayed onto the mold surface. The foam formulation was poured into the mold at 63° C. and the mold was sealed. When the foam was demolded, it stuck to the mold and tore apart.

EXAMPLE 5

The same mold and urethane foam composition were used as in Example 1. The mold was heated to 93° C. and had no residual wax. Carbon dioxide only was sprayed onto the mold surface. The foam formulation was poured into the mold at 65° C. and the mold was sealed. When the foam was demolded, it stuck to the mold and tore apart.

EXAMPLE 6

The same spraying apparatus, mold, and urethane foam formulation were used as in Example 1. A mold release formulation was prepared from 454 grams of a high-solids mold release compound and 3,632 grams of carbon dioxide. The high-solids release compound contained 77.2 grams of the wax characterized in Example 1 and 376.8 grams of a hydrocarbon solvent characterized in Example 1. The total weight of this mold release composition was 4,086 grams of which carbon dioxide was 88.9 wt%, the hydrocarbon solvent was 9.2 wt% and the wax was 1.9 wt%.

The composition was prepared at ambient temperature as in Example 1. Vessel 59 containing the composition was then heated so that the mold release composition was at 1,350 psig and 52° C. The contents were then sprayed for 4 seconds onto the surface of the hot (93° C.) mold which had been wiped clean of any residual wax. The urethane foam formulation of Example 1 was poured into the mold which was at 65° C. and the mold was sealed. When the foam was demolded, the foam released easily and cleanly and had a good, smooth surface typical of this formulation.

EXAMPLE 7

The same spray apparatus and mold were used as in Example 1. A mold release formulation was prepared from 227 grams of a high-solids release compound of Example 6 and 4,540 grams of carbon dioxide. The total weight of this mold release composition was 4,767 grams of which 95.2 wt% was carbon dioxide, 4.0 wt% was hydrocarbon solvent and 0.8 wt% was wax.

The mold release composition was prepared at ambient temperature as in Example 1. It was then heated in vessel 59 so that the temperature was 50° C. and the pressure was 1,500 psig. The contents of vessel 59 were then sprayed for 4 seconds onto the surface of the hot mold (85° C.) which had been wiped clean of any residual wax. The urethane foam formulation of Example 1 was poured into the mold which was at 65° C. and the mold was sealed. When the foam as demolded, the foam release easily and cleanly and had a good, smooth surface typical of this formulation.

EXAMPLE 8

The same spraying apparatus and mold release formulation as in Example 7 were used. Also, a conventional air gun (Speedaire) and a mold release composition containing 8.6 wt% solids (a mixture of a microcrystalline paraffin wax having a melting point range of 88° to 100° C. and a hydrocarbon solvent having a boiling point range of 150° to 190° C.) free of supercritical carbon dioxide, were used.

The conventional air gun was used to spray the release compound composition into 12 different containers. Each container was sprayed into for 4 seconds. The average amount of solids deposited per container was 4.18 grams with a standard deviation of 1.72. This corresponds to an average of 44.4 grams of hydrocarbon emitted during each spray.

The spraying apparatus and mold release formulation of Example 7 (0.8 wt% solids, 4.0 wt% hydrocarbon, 95.2 wt% carbon dioxide) were used to spray into 12 different containers. Each container was sprayed into for 4 seconds. The average amount of solids deposited per container was 0.45 grams with a standard deviation of 0.16. This corresponds to an average of 2.20 grams of hydrocarbon emitted during each spray. This average amount represents 5.0% of the average amount of hydrocarbon emitted during the spraying with the conventional air gun and the release compound composition. Therefore, an average of 95.0% reduction in hydrocarbon emissions was achieved through the use of the mold release formulation used in Example 7.

EXAMPLE 9

The same spraying apparatus, mold release composition, and mold were used as in Example 7. The mold release composition was at 50° C. and 1,350 psig when it was sprayed onto the surface of the hot (87° C.) mold. A urethane foam formulation of medium water content (about 5.5 parts of water per 100 parts by weight of total polyol) was poured into the mold at 65° C. and the mold was sealed. When the foam was demolded, it released easily and cleanly and had a good, smooth surface typical of this formulation.

EXAMPLE 10

The same spraying apparatus, mold release composition and mold were used as in Example 9. The mold release composition was at 46° C. and 1,275 psig when it was sprayed onto the surface of the hot (87° C.) mold. A urethane foam formulation of high water content (about 6.5 parts of water per 100 parts by weight of total polyol) was poured into the mold at 60° C. and the mold was sealed. When the foam was demolded, it released easily and cleanly and had a good, smooth surface typical of this formulation.

EXAMPLE 11

The same spraying apparatus, mold release composition, urethane foam formulation and mold were used as in Example 7. The mold release composition was sprayed at 43° C. and 1,100 psig onto the hot (85° C.) mold surface. The foam formulation was poured into the mold and the mold was sealed. When the foam was demolded, it released easily and cleanly and the surface of the foam had the good, smooth surface typical of this formulation.

EXAMPLE 12

The same spraying apparatus, mold release composition, urethane foam formulation and mold were used as in Example 7. The mold release composition was sprayed at 43° C. and 1,000 psig onto the hot (87° C.) mold surface. The foam formulation was poured into the mold and the mold was sealed. When the foam was demolded, it released easily and cleanly and the foam had the good, smooth surface typical of this formulation.

EXAMPLE 13

The same spraying apparatus, mold release composition, urethane foam formulation and mold were used as in Example 7. The mold release composition was sprayed at 41° C. and 800 psig onto the hot (87° C.) mold surface. The foam formulation was poured into the mold and the mold was sealed. When the foam was demolded, it released easily and cleanly and had the good, smooth surface typical of this formulation.

EXAMPLE 14

The same spraying apparatus, urethane foam formulation and mold were used as in Example 1. A mold release formulation was prepared from 22.8 grams of a microcrystalline paraffin wax, 68.2 grams of an aliphatic hydrocarbon, and 4,540 grams of carbon dioxide. The wax and the hydrocarbon were charged to vessel 59 as in Example 1. The total weight of this mold release composition was 4,631 grams, such that 0.5 wt% was wax, 1.5 wt% was hydrocarbon and 98.0 wt% was carbon dioxide.

The mold release composition was sprayed at 51° C. and 1,450 psig onto the hot (87° C.) mold which had been cleaned of residual wax. The urethane foam composition was poured into the mold at 65° C. and the mold was sealed. When the foam was demolded, it released easily and cleanly and had a good, smooth surface typical of this formulation.

EXAMPLE 15

The same urethane foam formulation and mold were used as in Example 14. No mold release composition was applied to the mold which had been cleaned of residual wax. The urethane foam formulation was poured into the mold at 65° C. and the mold was sealed. When the mold was opened, the foam did not release and tore apart.

We claim:

1. A process which comprises the steps of (i) forming a release surface by spray coating an area of a solid surface with a release agent obtained from a release agent formulation containing a solution, suspension or dispersion of a release agent and a supercritical fluid, (ii) depositing a mass of material onto the release surface, and (iii) separating the mass of material or a product derived from the mass of material, from the release surface.

2. A process which comprises (i) generating release surfaces by spray coating a release agent obtained from a solution, suspension or dispersion of a release agent and a supercritical fluid that vaporizes from the release agent from a high pressure zone through an orifice to a low pressure zone outside of the orifice, to form a spray of release agent particles which are deposited onto predetermined areas of a solid surface, (ii) depositing a mass onto the release surface containing the release agent, and (iii) separating the mass or a product derived from the mass from such surface which is covered by the release agent.

3. The process of claim 2 wherein the deposition of the release agent on the predetermined areas is as an essentially uniform film covering the predetermined area.

4. The process of claim 2 wherein the spray composition is heated prior to atomization.

5. The process of claim 4 wherein the minimum spray temperature is about 31° C. and the maximum temperature is determined by the thermal stability of the components in the liquid mixture.

6. The process of claim 5 wherein the spray temperature is between 35° C. and 90° C.

7. The process of claim 6 wherein the spray temperature is between 45° C. and 75° C.

8. The process of claim 1 wherein the mass of material is selected from the group consisting of thermoplastic resins thermosetting, resins, elastomers, food preparations and protective coatings.

9. The process of claim 1 wherein the mass that is deposited is a hardenable material.

10. The process of claim 1 wherein the spray coating involves the uniform deposition of a thin layer of the release agent over a predetermined surface area.

11. The process of claim 10 wherein migration of the release agent from such area is avoided.

12. The process of claim 1 wherein migration of the release agent into the subsequently applied material is avoided.

13. The process of claim 1 wherein the mass of material or a product derived from the mass of material separated from the surface are obtained essentially free of surface defects derived from interaction with the release agent.

14. The process of claim 1 wherein the deposition (ii) is effected by coating the area and the separation (iii) of the coating is effected by brushing the coated surface until the coating is removed.

15. The process of claim 1 comprising the molding of thermosetting resins and thermoplastics to form shaped articles, in which the interior molding surface of the mold in which the thermosetting resins and thermoplastics are to be molded are sprayed with a release agent obtained from a solution, suspension or dispersion comprising a release agent and a supercritical fluid that vaporizes from the sprayed release agent, the thermosetting resin or thermoplastic are thereafter supplied to the mold to contact the interior molding surface and molded therein to effect the shape conferred by the mold, and then the molded shaped article is removed from the mold.

16. The process of claim 1 wherein the supercritical fluid is carbon dioxide.

17. The process of claim 2 wherein the supercritical fluid is carbond dioxide.

18. The process of claim 3 wherein the supercritical fluid is carbon dioxide.

19. The process of claim 8 wherein the supercritical fluid is carbon dioxide.

20. The process of claim 9 wherein the supercritical fluid is carbon dioxide.

21. The process of claim 10 wherein the supercritical fluid is carbon dioxide.

22. The process of claim 11 wherein the supercritical fluid is carbon dioxide.

23. The process of claim 12 wherein the supercritical fluid is carbon dioxide.

24. The process of claim 13 wherein the supercritical fluid is carbon dioxide.

25. The process of claim 14 wherein the supercritical fluid is carbon dioxide.

26. The process of claim 16 wherein the supercritical fluid is carbon dioxide.

27. The process of claim 16 wherein the formulation contains a reduced amount of an active solvent for the release agent.

28. The process of claim 17 wherein the formulation contains a reduced amount of an active solvent for the release agent.

29. The process of claim 18 wherein the formulation contains a reduced amount of an active solvent for the release agent.

30. The process of claim 19 wherein the formulation contains a reduced amount of an active solvent for the release agent.

31. The process of claim 20 wherein the formulation contains a reduced amount of an active solvent for the release agent.

32. The process of claim 24 wherein the formulation contains a reduced amount of an active solvent for the release agent.

33. The process of claim 22 wherein the formulation contains a reduced amount of an active solvent for the release agent.

34. The process of claim 23 wherein the formulation contains a reduced amount of an active solvent for the release agent.

35. The process of claim 24 wherein the formulation contains a reduced amount of an active solvent for the release agent.

36. The process of claim 25 wherein the formulation contains a reduced amount of an active solvent for the release agent.

37. The process of claim 26 wherein the formulation contains a reduced amount of an active solvent for the release agent.

38. The process comprising the steps of:
   a. forming a fluid mixture in a closed system, said fluid mixture comprising:
      i. at least one release agent capable of forming a thin layer or coating on a mold surface,
      ii. at least one supercritical fluid, and
      iii. optionally, a reduced amount of an active solvent or solvent(s) capable of dissolving, suspending or dispersing the release agent;
   b. spraying said fluid mixture onto a mold surface to form a thin layer of the release agent thereon;
   c. introducing a molding composition to the mold surfaces containing the thin layer of release agent thereon and molding the composition in the mold to form a molded product; and
   d. separating the molded product from the mold.

39. The process of claim 38 wherein molding is effected by one of reaction injection molding (RIM), injection molding, compression molding, bulk molding, transfer molding, cast molding, spin cast molding, casting, vacuum forming, blow molding, calendar molding, lamination, molding of foam, and rotational molding.

40. A molding process which comprises:
   a. forming a fluid mixture in a closed system, said fluid mixture comprising:
      i. at least one wax compound capable of forming a layer on the mold surface,
      ii. at least one supercritical fluid, and
      iii. optionally, a reduced amount of an active solvent or solvent(s) capable of dissolving, suspending or dispersing the wax compound(s);
   b. spraying said fluid mixture onto a mold surface to form a thin wax layer thereon;
   c. introducing a molding composition to the mold surfaces containing the thin wax layer of release agent thereon and molding the compositions to form a molded product; and
   d. separating the molded product from the mold.

41. A molding process which comprises:
   a. forming a fluid mixture in a closed system, said fluid mixture comprising:
      i. at least one wax compound capable of forming a layer on the mold surface,
      ii. at least one supercritical fluid, and
      iii. optionally, a reduced amount of an active solvent or solvent(s) capable of dissolving, suspending or dispersing the wax compound(s);
   b. spraying said fluid mixture by electrostatic means onto a mold surface to form a thin wax layer thereon;
   c. introducing a molding composition to the mold surfaces containing the thin wax layer of release agent thereon and molding the compositions to form a molded product; and
   d. separating the molded product from the mold.

42. The process of claim 40 wherein the molding composition comprises a composition which forms a polyurethane.

43. The process of claim 41 wherein the molding composition comprises a composition which forms a polyurethane.

44. The process of claim 42 wherein the polyurethane is a polyurethane resin.

45. The process of claim 43 wherein the polyurethane is a polyurethane resin.

46. The process of claim 44 wherein the polyurethane is a polyurethane foam.

47. The process of claim 45 wherein the polyurethane is a polyurethane foam.

48. A process for the release preparation of mold surfaces in which the polymerization of an active hydrogen compound and an isocyanate compound is carried out to form a molded article conforming to the mold, wherein the mold surfaces are release prepared prior to said polymerization by the process which comprises:
   a. forming a fluid mixture in a closed system, said fluid mixture comprising:
      i. at least one wax compound capable of forming a layer on the mold surface,
      ii. at least one supercritical fluid, and
      iii. optionally, a reduced amount of an active solvent or solvent(s) capable of dissolving, suspending or dispersing the wax compound(s); and
   b. spraying said fluid mixture onto a mold surface to form a wax layer thereon.

49. The process of claim 44 wherein there is formed a polyurethane foam on the mold surface containing the wax layer.

50. An apparatus for the deposition of a release agent mixture comprising a supercritical fluid and a release agent onto a release surface which comprises:
   a. means for forming a supercritical fluid,
   b. heating means for reducing the viscosity of a release agent,
   c. means for combining the release agent and the supercritical fluid into a release agent mixture and maintaining the release agent mixture in the supercritical fluid state, and
   d. means for spraying the release agent mixture in the supercritical state onto a release surface, and
   e. a release surface onto which the release agent mixture is deposited.

* * * * *